United States Patent [19]

Ohmamyuda et al.

[11] Patent Number: 5,239,353
[45] Date of Patent: Aug. 24, 1993

[54] OPTICAL DISTANCE MEASURING APPARATUS

[75] Inventors: Yukio Ohmamyuda, Sagamihara; Shigeru Kimura, Yokohama; Toru Tanabe, Machida; Kazuhisa Iwasaki, Yokohama; Takao Seto, Yokohama; Hideki Kitamura, Yokohama; Kazuhiko Sugimura, Yokohama; Yasushi Senoo, Yokohama, all of Japan

[73] Assignee: Stanley Electric Co., Ltd., Tokyo, Japan

[21] Appl. No.: 846,817

[22] Filed: Mar. 6, 1992

[30] Foreign Application Priority Data

Mar. 12, 1991 [JP] Japan .................................. 3-072603

[51] Int. Cl.⁵ ............................................... G01C 3/08
[52] U.S. Cl. ........................................ 356/5; 356/135; 368/120
[58] Field of Search .................... 356/5, 135; 368/120

[56] References Cited

U.S. PATENT DOCUMENTS 4,699,508 10/1987 Bölkow et al. ........................ 356/5
4,942,561 7/1990 Ohishi et al. ........................ 356/5
5,082,364 1/1992 Russell ................................. 356/5

Primary Examiner—Mark Hellner
Attorney, Agent, or Firm—Frishauf, Holtz, Goodman & Woodward

[57] ABSTRACT

A two-eyed type optical distance measuring apparatus operable in accordance with a phase difference detecting process to optically measure a distance between the apparatus and an object to be measured is disclosed. To determine the distance between the apparatus and the object to be measured, a phase difference between the phase of a reflected light beam reflected from the object to be measured and the optical phase of a reference light beam derived from partial division of a distance measuring light beam emitted from a light source is detected and calculated. The apparatus includes as essential components a light source disposed in a housing on the light emitting side to emit a modulated distance measuring light beam therefrom toward the object to be measured, a light receiving element positioned in a housing on the light receiving side and a reference light introducing mechanism for introducing a part of the modulated distance measuring light beam emitted from the light source into the light receiving element via an optical fiber. To prepare the reference light beam, a shade is arranged at the intermediate part of the housing on the light emitting side. In addition, an iris mechanism is disposed on the incident side of the optical fiber to variably adjust an optical quantity of the reference light beam.

9 Claims, 1 Drawing Sheet

OPTICAL DISTANCE MEASURING APPARATUS

BACKGROUND OF THE INVENTION

1. Field of the Invention

The present invention relates generally to an optical distance measuring apparatus for measuring a distance between an object to be measured (target) and a distance measuring operation location where a distance measuring operation is performed with the apparatus. More particularly, the present invention relates to a two-eyed type optical distance measuring apparatus of the aforementioned kind operable in accordance with a phase difference detecting process.

2. Description of the Prior Art

To facilitate understanding of the present invention, a typical conventional two-eyed type optical distance measuring apparatus of the aforementioned kind will briefly be described below with reference to FIG. 2.

FIG. 2 is an illustrative view of the conventional two-eyed type optical distance measuring apparatus which schematically shows the structure of the same. Specifically, the apparatus includes a housing a in which a light source b and a light receiving element c are arranged. A light beam (emitted light beam $L_1$) output from the light source b in the form of a modulated distance measuring light beam is modulated in a light emitting circuit (not shown) and is emitted through a emitted light lens d toward a light reflecting member P which is constructed of a corner prism placed at a distance measuring location, i.e., a target.

A reflected light beam $L_2$ reflected from the light reflecting member P is once collected by a light receiving lens e and then received by the light receiving element c. On the other hand, a part of the modulated distance measuring light beam output from the light source b is introduced into the light receiving element c through a reference light passage including a first reflective mirror f and a second reflective mirror g, as a reference light beam $L_3$ so that the reference light beam $L_3$ is received by the light receiving element c. Subsequently, the reference light beam $L_3$ is subjected to photoelectrical conversion in a light receiving circuit (not shown) in which a phase difference between the optical phase of the reference light beam $L_3$ and the optical phase of the reflected light beam $L_2$ is detected so as to determine a distance between the apparatus and the target by performing a comparative calculating operation with the aid of a calculating circuit (not shown).

A problem of the conventional apparatus constructed as mentioned above, is that a distance measuring operation is restrictively performed only within the range of 1 to 2 km with the apparatus including a corner prism having a high reflectivity as a light reflecting member. In recent years, however, earnest requests have been raised from users for providing a two-eyed type optical distance measuring apparatus which assures that a longer distance can reliably be measured therewith. When the longer distance is practically measured, it is absolutely necessary that an output from the light source b is increased and a sensitivity of the light receiving element c is substantially elevated.

However, when the output from the light source b is increased to satisfy the foregoing necessity, a part of the reflected light beam $L_2$ is unavoidably received by the light receiving element c as a stray light via the lens surfaces of the light emitting lens d and the light receiving lens e separately arranged on the front surface of the housing a in parallel with each other or via the reference light passage. Thus, the resulting distance measurement is erroneously measured. Thus, there is a possibility that a measuring accuracy is undesirably degraded.

On the contrary, when the sensitivity of the light receiving element c is substantially elevated, a phenomenon of electrical induction is liable to appear, because a light emitting portion (i.e., the light source b) and a light receiving portion (i.e., the light receiving element c) are arranged in a single mirror sleeve of the housing a. With the conventional apparatus, however, it is very difficult to completely prevent appearance of the phenomenon of electrical induction as mentioned above.

In addition, in a case where a shorter distance is measured, an optical quantity of the reflected light beam received by the light receiving element c is remarkably increased, causing an output from the light receiving element c to be undesirably saturated. As a result, a distance measuring operation is erroneously performed which has reduced accuracy. To obviate this problem, it is necessary to variably control an optical quantity of the emitted light beam.

SUMMARY OF THE INVENTION

The present invention has been made with the foregoing background in mind.

An object of the present invention is to provide a two-eyed type optical distance measuring apparatus operable in accordance with a phase difference detecting process wherein a distance measuring operation can practically be performed no matter how an output from a light source is increased.

Another object of the present invention is to provide a two-eyed type optical distance measuring apparatus operable in accordance with a phase difference detecting process wherein a distance measuring operation can be performed with a high accuracy.

According to the present invention, there is provided a two-eyed type optical distance measuring apparatus operable in accordance with a phase difference detecting process, wherein the apparatus comprises light emitting means for emitting a light beam from a light source through a light emitting lens toward a light reflecting member, i.e., an object whose distance is to be measured and which is placed at a distance measuring location, the light beam being subjected to optical modulation to provide a modulated distance measuring light beam; light receiving means arranged separately from the light emitting means in a spaced apart relationship to receive a reflected light beam reflected from the light reflecting member through a light receiving lens, the light receiving means including a light receiving element for receiving the reflected light beam collected by the light receiving lens; and reference light introducing means for introducing a part of the modulated distance measuring light beam emitted from the light source into the light receiving means as a proofing light beam via a reference light passage, the reference light introducing means including light shielding means serving to variably adjust an optical quantity of the reference light beam, and moreover, serving also to divide a part of the modulated distance measuring light beam emitted from the light source into a reference light beam having a predetermined optical quantity, iris means for variably adjusting an optical quantity of the reference light beam to be conducted to the light receiving means in cooperation with the light shielding means, light conducting means for conducting to the light receiving means the reference light beam having an optical quantity that has been properly adjusted by the light shielding means, and shifting means for shifting the reference light beam introduced into the light receiving means by the reference light introducing means, to the reflected light beam reflected from the light reflecting member and vice versa; whereby a distance between the apparatus and the light reflecting member, i.e., the object to be measured is determined by detecting and calculating a phase difference between the optical phase of the reference light beam and the optical phase of the reflected light beam reflected from the light reflecting member.

Specifically, the light emitting means comprises a light source located at the focus of the light emitting lens and a light emitting circuit electrically connected to the light source.

On the other hand, the light receiving means comprises a light receiving element located at the focus of the light receiving lens and a light receiving circuit electrically connected to the light receiving element.

The reference light passage of the reference light introducing means comprises an optical fiber extending from the iris mechanism disposed outside of a light emitting housing on first light receiving side thereof, to a second housing on the light receiving side thereof, so as to allow the reference light beam to be introduced into the light receiving element therethrough.

In addition, the light shielding means of the reference light introducing means comprises a shade stationarily disposed at the intermediate position of the housing on the light emitting side so as to divide a part of the modulated distance measuring light beam emitted from the light source into a reference light beam having a predetermined optical quantity.

Additionally, the iris means of the reference light introducing means comprises an iris mechanism disposed on the light incident side of the optical fiber through which the reference light beam is introduced into the light receiving element and a lens disposed between the shade and the iris mechanism so as to variably adjust an optical quantity of the reference light beam.

Further, the shifting means comprises a shutter disposed outside of the housing on the light receiving side so as to shift the reflected light beam reflected from the light reflecting member to the reference light beam transmitted through the optical fiber and vice versa in cooperation with the iris mechanism.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

Now, the present invention will be described in detail with reference to the accompanying drawings which illustrate a preferred embodiment of the present invention.

Figure 2:
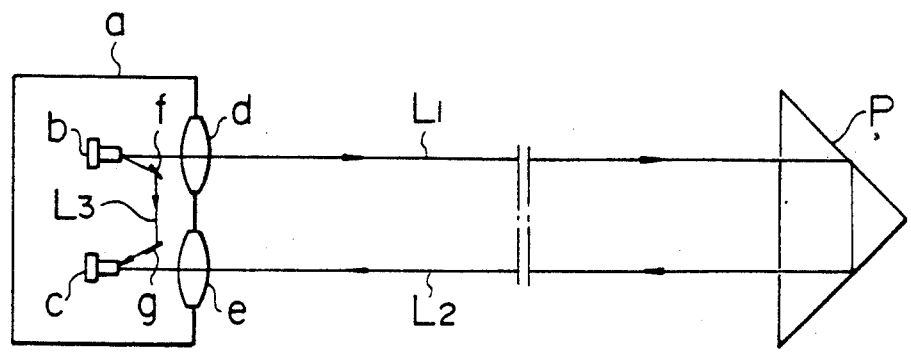
FIG. 2 is an illustrative view of a conventional two-eyed type optical distance measuring apparatus which schematically shows the structure of the apparatus.

In general, a process of optically measuring a distance is usually classified into four processes, one of them being a light wave interference process wherein the wavelength of a light beam is taken as a reference value representing a certain length. Another process is an optical intensity modulating process wherein a light beam having a constant optical intensity is converted into a strong/weak light beam by employing converting means or is converted into the wavelength of a light beam which is dependent on the modulated frequency of the light beam that is specific to a light source adapted to output a strong/weak light beam that is to be taken as a reference. Another process is a phase difference detecting process wherein a phase difference between the optical phase of a reflected light beam and the optical phase of a reference light beam output from a light source by use of a photoelectrical conversion step, is detected and calculated to determine a distance. A process is a process wherein a long distance is measured by utilizing the speed of a light beam. Here, it should be noted that the phase difference detecting process, briefly described above, with reference to FIG. 2 is employed to carry out the present invention. In other words, a two-eyed type optical distance measuring apparatus, to which the present invention is applied, is adapted to operate in accordance with the phase difference detecting process.

Figure 1:
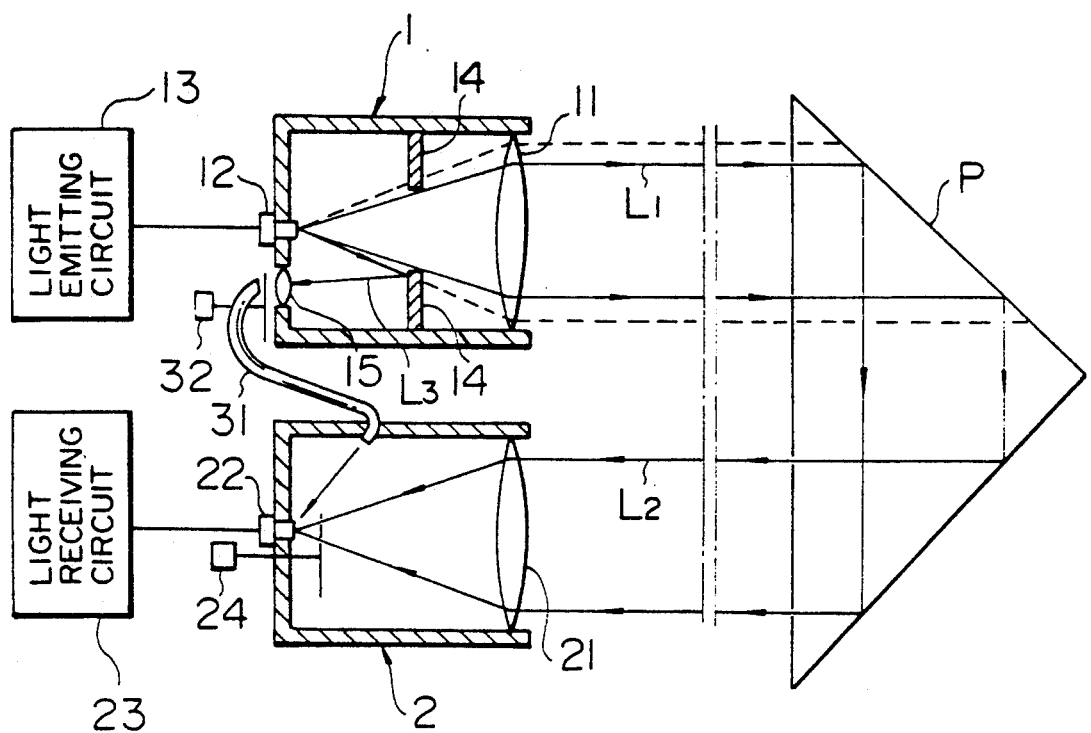
FIG. 1 is an illustrative view of a two-eyed type optical distance measuring apparatus according to an embodiment of the present invention which schematically shows the structure of the apparatus.

FIG. 1 is an illustrative view of a two-eyed type optical distance measuring apparatus according to an embodiment of the present invention which schematically shows the structure of the apparatus. In FIG. 1, reference numeral 1 designates a housing on the light emitting side designed in the form of a mirror sleeve and reference numeral 2 designates a housing on the light receiving side likewise designed in the form of a mirror sleeve. As is apparent from the drawing, both the housings 1 and 2 are arranged separately from each other in a spaced relationship.

A light emitting lens 11 is disposed on the front surface of the housing 1, and a light source 12 constructed of, e.g., a light emitting diode, a laser light diode or the like, is arranged in the housing 1 at the position positionally coinciding with the focus of the light emitting lens 11.

When the light source 12 is activated by a light emitting circuit 13 to output a measuring light beam therefrom while being optically modulated in the light emitting circuit 13, the modulated distance measuring light beam is emitted to the light emitting lens 11 from which it is emitted in the form of a parallel emitted light beam $L_1$ toward a light reflecting member P constructed of a corner prism and placed at a distance measuring location.

A parallel reflected light beam $L_2$ reflected from the light reflecting member P is likewise received by a light receiving lens 21 disposed on the front surface of the housing 2 from which it is received by a light receiving element 22 arranged at the position positionally coinciding with the focus of the light correcting lens 21. The light receiving element 22 is electrically connected to a light receiving circuit 23 in which the reflected light beam $L_2$ is photoelectrically converted so as to detect the optical phase of the reflected light beam $L_2$.

A shade 14, serving as light shielding means, is arranged in the housing 1 at the intermediate position between the light emitting lens 11 and the light source 12. Specifically, the shade 14 comprises a reflective mirror such that a part of the emitted light beam $L_1$ emitted from the light source 12 is introduced into a reference light passage as a reference light beam $L_3$. It should be added that the shade 14 additionally serves to variably adjust an optical quantity of the reference light beam $L_3$, and moreover, divides the emitted light beam $L_1$ into the reference light beam $L_3$ having a predetermined optical quantity.

The reference light beam $L_3$ reflected from the shade 14 is made to fall incident on the inlet of an optical fiber 31 serving as a light conducting means via a reference light lens 15. Subsequently, the reference light beam $L_3$ is introduced into the light receiving element 22 through the optical fiber 31.

In the drawing, reference numeral 32 designates an iris mechanism which is disposed on the light incident side of the optical fiber 31 for the reference light beam $L_3$. The iris mechanism 32 serves to variably adjust an optical quantity of the reference light beam $L_3$ reflected from the shade 14 via the reference light lens 15. In addition, the iris mechanism 32 serves also as a shutter mechanism for equalizing an optical quantity of the reflected light beam $L_2$ reflected from the object, i.e., the light reflecting member P, to an optical quantity of the reference light beam $L_3$.

In addition, reference numeral 24 designates a shutter disposed in the housing 2 to serve as shifting means. As is apparent from the drawing, the shutter 24 is arranged between the light receiving lens 21 and the light receiving element 22 so as to shift the reflected light beam $L_2$ reflected from the light reflecting member P to the reference light beam $L_3$ transmitted through the optical fiber 31 and vice versa in cooperation with the iris mechanism 32. Thus, the reference light introducing means comprises of the shade 14, the reference light lens 15, the shutter 24, the optical fiber 31, the iris mechanism 32 and the shutter 24.

As described above, according to the present invention, the two-eyed type optical distance measuring apparatus is constructed such that the housing 1 on the light emitting side is arranged independently of the housing 2 on the light receiving side in the spaced relationship. Variable adjustments of an optical quantity of the reference light beam $L_3$ and division of the same from the emitted light beam $L_1$ emitted from the light source 12 are accomplished by the shade 14. An optical quantity of the reference light beam $L_3$ reflected from the shade 14 is equalized to an optical quantity of the reflected light beam $L_2$ reflected from the target, i.e., the light reflecting member P, and the reference light beam $L_3$ whose optical quantity has been properly adjusted by the iris mechanism 32 is introduced into the light receiving element 22 through the optical fiber 31. Thus, there is no possibility that a part of the emitted light beam $L_1$ is received by the light receiving element 22 as a stray light no matter how an output from the light source 12 is increased.

In addition, the apparatus of the present invention makes it possible to prevent the light receiving element 22 from being undesirably saturated, since not only an optical quantity of a part of the emitted light beam $L_1$ to be used as a reference light beam $L_3$, but also a quantity of the division of the reference light beam $L_3$ from the emitted light beam $L_1$ emitted from the light source 12 are properly controlled by the shade 14. Thus, a distance measuring operation can be performed without any particular error with the apparatus of the present invention. In addition, a distance measuring operation can be performed with an improved accuracy by employing the apparatus of the present invention.

Since the apparatus of the present invention is constructed in the above-described manner, a distance between the apparatus and the target, i.e., the light reflecting member P can be very accurately determined by detecting and calculating a phase difference between the optical phase of the reference light beam $L_3$ and the optical phase of the reflected light beam $L_2$ with the aid of a counting circuit (not shown).

While the present invention has been described above with respect to a single preferred embodiment thereof, it should of course be understood that the present invention should not be limited only to this embodiment but various changes or modifications may be made without departure from the scope of the present invention as defined by the appended claims.

What is claimed is:

1. A two-eyed type phase difference detecting optical distance measuring apparatus comprising:

light emitting means for emitting a modulated distance measuring light beam through a light emitting lens toward a light reflecting object positioned at a location distant from said light emitting means;

light receiving means, spaced apart from said light emitting means, for receiving a reflected light beam reflected from said light reflecting object through a light receiving lens, said light receiving means including a light receiving element for receiving said reflected light beam through said light receiving lens; and reference light introducing means for introducing a first portion of said modulated distance measuring light beam emitted from said light emitting means, into said light receiving means as a reference light beam via a reference light passage;

said reference light introducing means including:

light shielding means for variably adjusting an optical quantity of said reference light beam, and for dividing said first portion of said modulated distance measuring light beam from the emitted light modulated distance measuring light beam to provide said reference light beam that has a predetermined optical quantity;

iris means for variably adjusting an optical quantity of said reference light beam;

coupling means for coupling the reference light beam to said light receiving means, said coupling means including light conducting means for conducting said reference light beam having said predetermined optical quantity that has been adjusted by said light shielding means; and light shifting means for selectively shifting said reference light beam, introduced into said light receiving mean by said reference light introducing means, respectively to and from said reflected light beam reflected from said light reflecting object;

whereby a distance between said apparatus and said light reflecting object is determined by detecting and calculating a phase difference between an optical phase of said reference light beam and an optical phase of said reflected light beam reflected from said light reflecting object.

2. The apparatus as claimed in claim 1, wherein said light emitting means comprises:
   a light source located at a focal point of said light emitting lens; and
   a light emitting circuit, electrically connected to said light source.

3. The apparatus as claimed in claim 1, wherein said light receiving means comprises:
   a light receiving element located at a focal point of said light receiving lens; and
   a light receiving circuit electrically connected to said light receiving element.

4. The apparatus as claimed in claim 1, wherein said reference light passage of said reference light introducing means comprises an optical fiber extending from said iris means, disposed on an outside portion of a light beam emitting first housing on a light beam emitting side of said first housing, to a light receiving side of a second housing, said optical fiber introducing said reference light beam into said light receiving element therethrough.

5. The apparatus as claimed in claim 1, wherein:
   said light shielding means of said reference light introducing means comprises:
   a stationary shade disposed at an intermediate position of said first housing for dividing said first portion of said emitted distance measuring light beam, to thereby provide said reference light beam having said predetermined optical quantity.

6. The apparatus as claimed in claim 1, wherein said iris means of said reference light introducing means comprises:
   an iris mechanism disposed on a light incident side of an optical fiber, said reference light beam being introduced into said light receiving element through said iris mechanism; and
   a lens disposed between said shade and said iris mechanism for variably adjusting said optical quantity of said reference light beam.

7. The apparatus as claimed in claim 1, wherein said light shifting means comprises a shutter disposed on an outside portion of a housing on a light receiving side of said housing for shifting said reflected light beam reflected from said light reflecting object to form said reference light beam that is transmitted through an optical fiber and said iris means.

8. The apparatus as claimed in claim 1, wherein said light shifting means comprises a shutter disposed on an outside portion of a housing on a light receiving side of said housing for shifting said reference light beam through said iris means and an optical fiber to said reflected light beam reflected from said light reflecting object.

9. The apparatus as claimed in claim 1, wherein said light beam emitted by said light emitting means is optically modulated to provide said modulated distance measuring light beam.

* * * * *